Dec. 18, 1962 M. ROSATI 3,069,077
REPEAT STORING DEVICE FOR COMPUTING MACHINES
Filed June 25, 1958 7 Sheets-Sheet 1

FIG. 1

INVENTOR
Mario Rosati
BY
Michael S. Striker
ATTORNEY

Dec. 18, 1962 M. ROSATI 3,069,077
REPEAT STORING DEVICE FOR COMPUTING MACHINES
Filed June 25, 1958 7 Sheets-Sheet 3

INVENTOR
Mario Rosati
BY Michael S. Striker
ATTORNEY

Dec. 18, 1962  M. ROSATI  3,069,077
REPEAT STORING DEVICE FOR COMPUTING MACHINES
Filed June 25, 1958  7 Sheets-Sheet 4

FIG. 3'

INVENTOR.
Mario Rosati
BY Michael S. Striker

ATTORNEY

Dec. 18, 1962  M. ROSATI  3,069,077
REPEAT STORING DEVICE FOR COMPUTING MACHINES
Filed June 25, 1958  7 Sheets-Sheet 5

INVENTOR
Mario Rosati
BY Michael S. Striker
ATTORNEY

Dec. 18, 1962 M. ROSATI 3,069,077
REPEAT STORING DEVICE FOR COMPUTING MACHINES
Filed June 25, 1958 7 Sheets-Sheet 6

INVENTOR
Mario Rosati
BY
Michael S. Striker
ATTORNEY

Dec. 18, 1962　　　　　　　M. ROSATI　　　　　　3,069,077
REPEAT STORING DEVICE FOR COMPUTING MACHINES
Filed June 25, 1958　　　　　　　　　　　　7 Sheets-Sheet 7

FIG. 9

INVENTOR.
Mario Rosati
BY Michael S. Striker

ATTORNEY

United States Patent Office 3,069,077
Patented Dec. 18, 1962

3,069,077
REPEAT STORING DEVICE FOR COMPUTING MACHINES
Mario Rosati, Milan, Italy, assignor to Lagomarsino F.A.I., Milan, Italy
Filed June 25, 1958, Ser. No. 744,591
Claims priority, application Italy June 25, 1957
11 Claims. (Cl. 235—60)

The present invention relates to a repeat storing device for computing machines, and more particularly to a repeat storing device in which a number is stored during one operational cycle of the machine so as to control the machine during the following operational cycles until a new number is introduced into the machine.

In accordance with the present invention, a number thus stored in the repeat storing means may be automatically transferred into the accumlator of the machine during each following cycle, or printed during each following cycle.

The present invention is advantageously applied to a computing machine of the ten-key type in which a pin carriage is provided. In machines of this type, a value is indexed by successive actuation of the keys which operate in sequence to displace a selected pin in the associated order of the pin carriage and to shift the carriage denominationally, order by order, from an initial position so that after the entire number has been introduced, the pin carriage represents the entire number. After the number has been introduced into the pin carriage which moves step by step to associate the different orders with the keys, and the number registered in the pin carriage is transferred into the accumulator of the machine by selector rods cooperating with gear sectors which also control the printing means of the machine, the pin carriage is returned to the initial position.

A machine of this type is, for example, described in the U.S. Patent No. 1,899,444. In accordance with known machines of this type, it is necessary to introduce a number during each operational cycle of the machine, even if the same number is used repeatedly in consecutive cycles. It has been proposed to overcome this disadvantage by providing repeating devices which avoid returning the pin carriage to initial position at the end of every cycle of the machine. However, the known repeating devices have considerable disadvantages since operation of a repeat key is required, and subsequently the operator has to return the pin carriage to initial position. Only after the return operation, can the operator introduce another number into the machine.

It is one object of the present invention to overcome this disadvantage of known repeat devices, and to provide a repeat storing device which automatically stores each number introduced into the machine, and automatically effects registering of such a number during following operational cycles of the machine, if no new number is introduced into the machine.

Another object of the present invention is to provide means permitting the use of the result of a calculation in the following computing operations.

Another object of the present invention is to provide a repeat storing device in which a number introduced during a first operational cycle, is automatically cleared during the following operational cycle if the pin carriage has moved at least one step from the initial position due to introduction of one or more digits in the following cycle.

With these objects in view, one embodiment of the present invention mainly consists in a repeat storing device for a computing machine and comprises a differential element moving in a forward stroke and a return stroke during each cycle of the computing machine, a repeat storing means shiftable between a position coupled to the differential element for movement with the same and a disengaged position, means urging the repeat storing means to move to a normal zero position, and control means for engaging the repeat storing means with the differential element during the return stroke of the differential element and adjustable to alternatively maintain the repeat storing means engaged or to disengage the same from the differential element during the forward stroke thereof in the following cycle of the differential element.

The differential element is movable to a plurality of digital positions, and is connected to register means and printing means for registering and printing the respective digit. When the repeat storing means is coupled to the differential element during the return stroke of the same, it will move out of its normal zero position, and assume a position representing the respective digit when the differential element has returned to its normal position. The repeat storing means tends to return to its normal position, and if it remains coupled to the differential element, it will control the movement of the differential element during the next following operational cycle to a position representing the digit introduced during the first operational cycle. However, if the repeat storing means is disengaged from the differential element, it will return to its normal position without controlling the differential actuation of the differential element during the following operational cycle.

In accordance with the preferred embodiment of the present invention, the control means for controlling the engagement and disengagement of the repeat storing means is adjusted to control the movement of the repeat storing means to disengaged position when the pin carriage of the machine performs its first stepwise movement during the introduction of a number in the following cycle. The repeat storing means is preferably also controlled by the total-taking key of the machine.

Preferably, the selector rods, which normally cooperate with the pins of the pin carriage to control the differential movement of the differential elements, are automatically disconnected from the pin carriage when the repeat storing means operate the differential elements.

The repeat storing means of the present invention preferably include a set of spring-loaded gear pinions meshing with differential gear sectors when engaged therewith. Each pinion and each gear sector is associated with an order of the machine. In this embodiment of the present invention, the digit or digits introduced through the keyboard of the machine are stored in the repeat storing pinions which are engaged with the differential sectors on the return stroke in the first operational cycle of the machine, and the pinions are maintained in engagement with the differential sectors of the machine in all subsequent operational cycles until another digit is again set in the keyboard. Consequently, when the pin carriage returns to its initial position and is cleared in a conventional operation, the previously introduced number remains stored in the repeat storing pinions. During the following cycles, the spring loaded pinions control the movements of the differential gear sectors to positions representing the respective digits, and are then again loaded to store the same digits during the return movement of the differential gear sectors. The total key of the machine is connected to the control device for the repeat storing means in such a manner as to obtain the same effect as the shifting of the pin carriage in introducing a number. Thereby, the total of the proceeding computing operations is stored in the repeat storing pinions, and can be used as an addendum in subsequent operations.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIGURE 3' is a fragmentary side view illustrating elements omitted in FIGURE 3;

Figure 3:
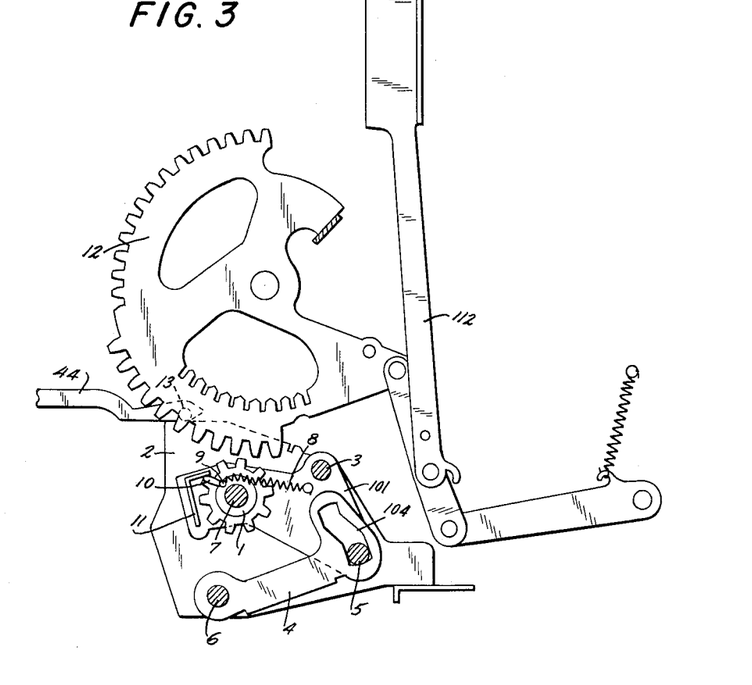
FIGURE 3 is a fragmentary side view illustrating elements omitted in FIGURE 2 in one operational position.
Figures 5, 6:
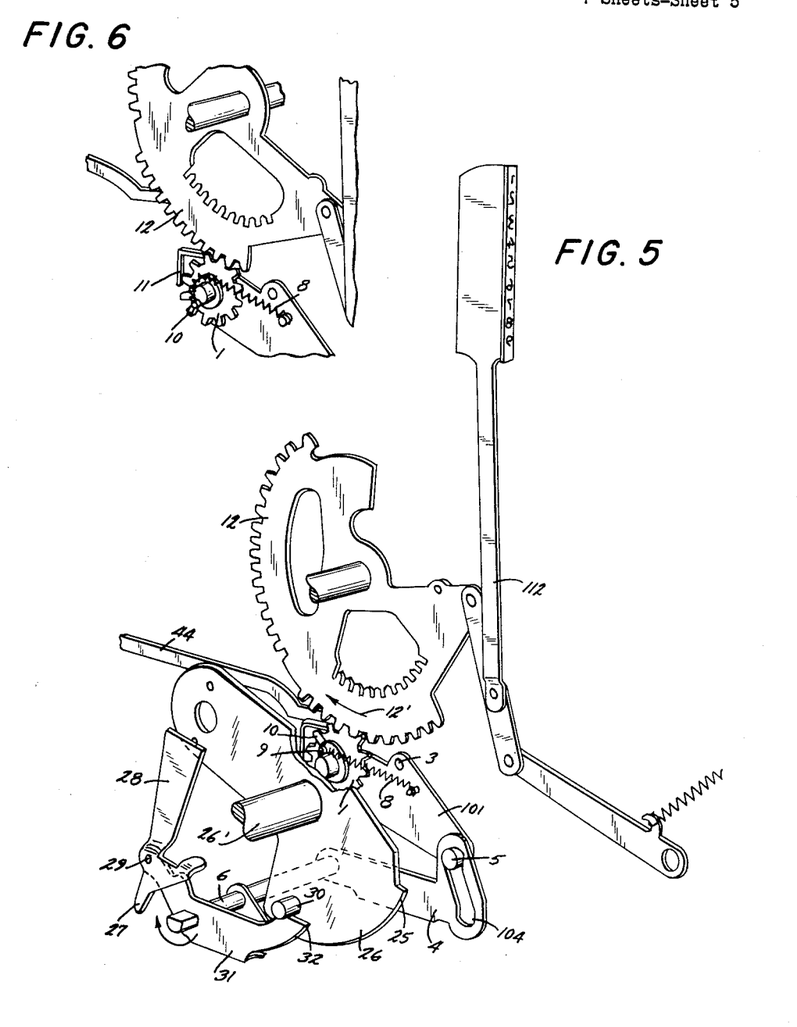
FIGURE 5 is a fragmentary perspective view illustrating an operational condition of the apparatus.
FIGURE 6 is a fragmentary perspective view illustrating elements of FIGURE 5 in another operational position.
Figures 7, 8:
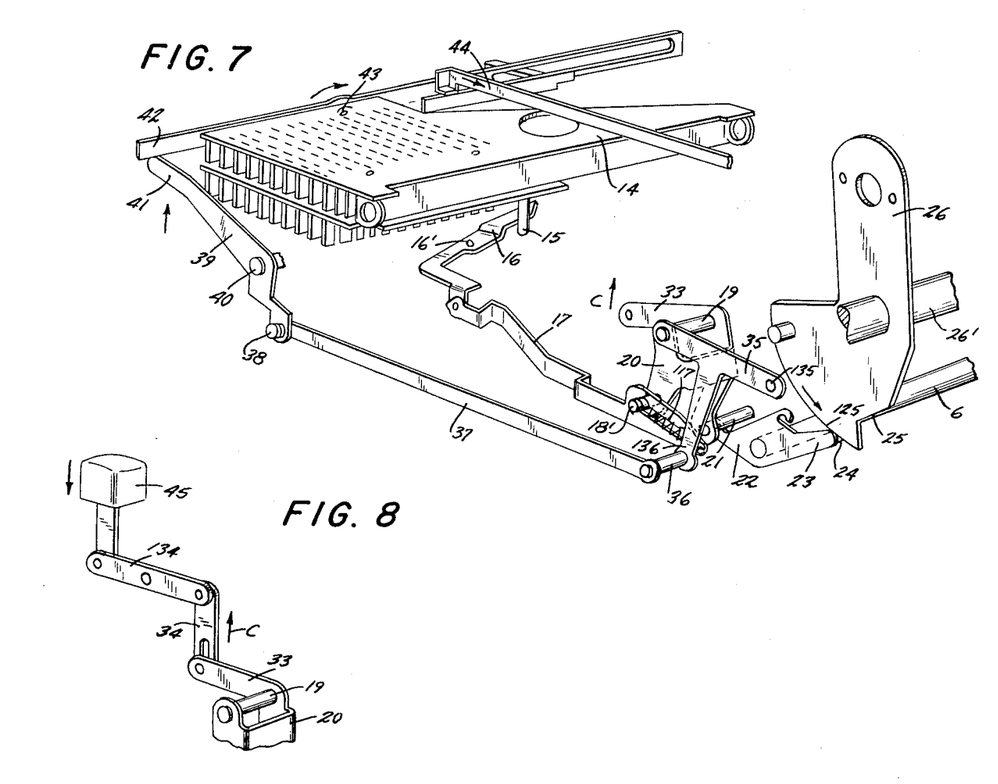
FIGURE 7 is a fragmentary perspective view illustrating the device in another operational position.
FIGURE 8 is a fragmentary perspective view illustrating a key for operating the device shown in the other figures independently of the pin carriage; and, FIG. 9 is a fragmentary perspective view illustrating a mechanism provided at the pin carriage.

Referring now to the drawings, and more particularly to FIGURES 3, 5 and 7, a set of differential gear sectors 12 is provided which are respectively associated with the orders of the pin carriage 14, and are controlled by selector rods 44 which cooperate with the pins of the pin carriage 14 and control the differential movements of the gear sectors 12 to transfer the digits from the pin carriage to the gear sectors 12 by turning the gear sectors. The gear sectors 12 are connected to printing members 112 whereby numbers introduced into the machine are printed. The construction is only shown for one order of the machine, but it will be understood that a device as shown is provided for each order of the pin carriage and of the printing means of the machine.

Figure 4:
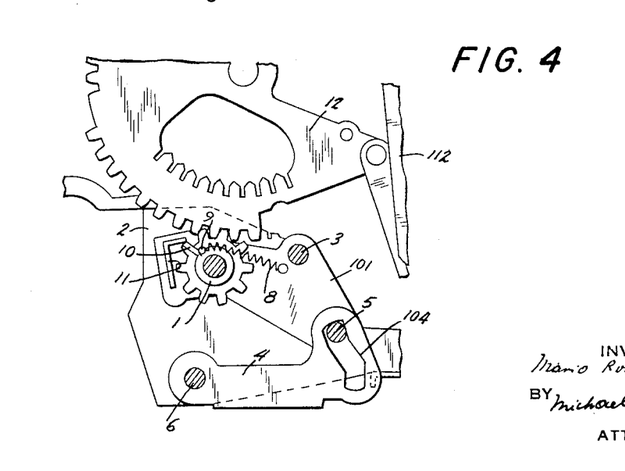
FIGURE 4 is a fragmentary side view illustrating elements of FIGURE 3 in another operational position.

As best seen in FIGURES 3 and 4, a supporting member 101 is mounted on shaft 3 on the frame 2, and turnably supports a repeat storing pinion 1. A lever 4 is fixed on a shaft 6 and has a slot 104 receiving a pin 5 which is fixed on the supporting member 101. When shaft 6 is turned, supporting member 101 also turns so that pinion 1 moves between the disengaged position shown in FIGURE 3 and a coupling position shown in FIGURES 4, 5 and 6 engaging the gear teeth of the associated gear sector 12.

A spring 8 is secured at one end to the supporting member 101 and at the other end to a pin 9 on the respective pinion 1. Pinion 1 has a projection 10 which abuts against a stop means 11 in the normal zero position of pinion 1. When pinion 1 engages gear sector 12 as shown in FIGURE 5, and gear sector 12 is turned in direction of the arrow 12' in FIGURE 5, which corresponds to the return movement of gear sector 12, pinion 1 is turned against the action of spring 8 and spring 8 is wound on an annular shoulder of pinion 1 as shown in FIGURE 6. In this position, spring 8 tends to turn the pinion into its normal zero position in which projection 10 abuts against stop 11. If such movement of pinion 1 under the action of spring 8 is permitted in the disengaged position of pinion 1 shown in FIGURE 3, it will have no effect on the gear sectors. However, if the pinion 1 is coupled to the gear sector 12 while being turned under the action of spring 8, it will control the rotation of the gear sector 12 until projection 10 abuts on stop means 11.

Figure 1:
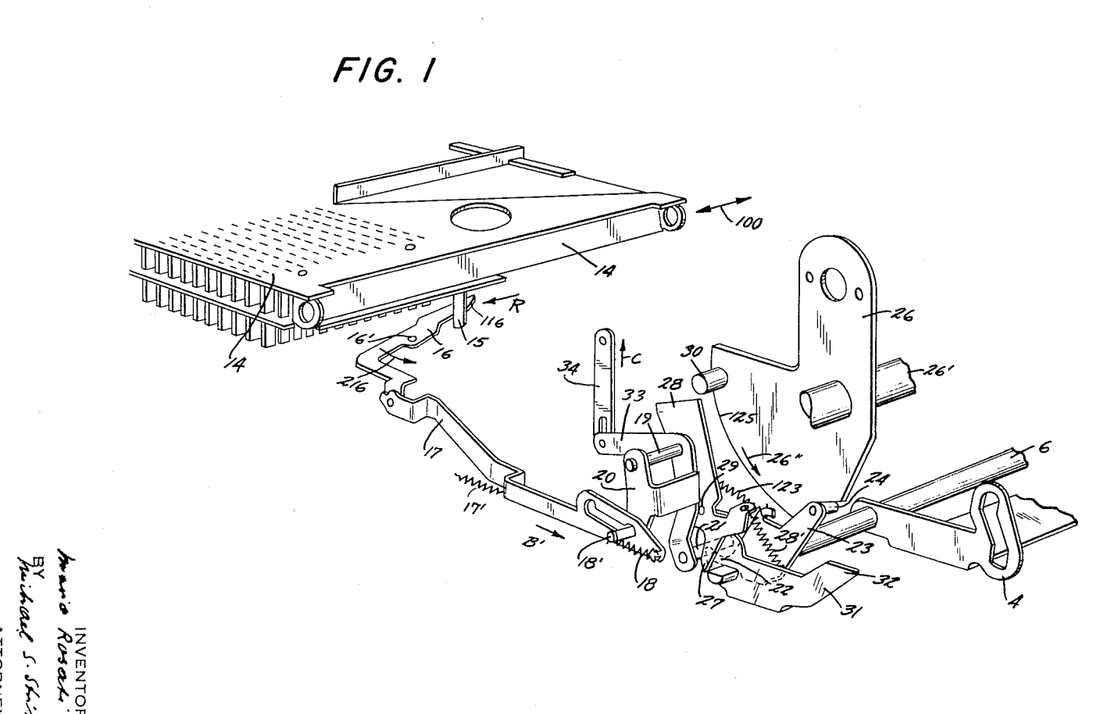
FIGURE 1 is a perspective view illustrating an apparatus according to the present invention in simplified form, omitting certain parts shown in other figures for the sake of clarity, and illustrating the arrangement for a single order of the machine in starting position.
Figure 2:
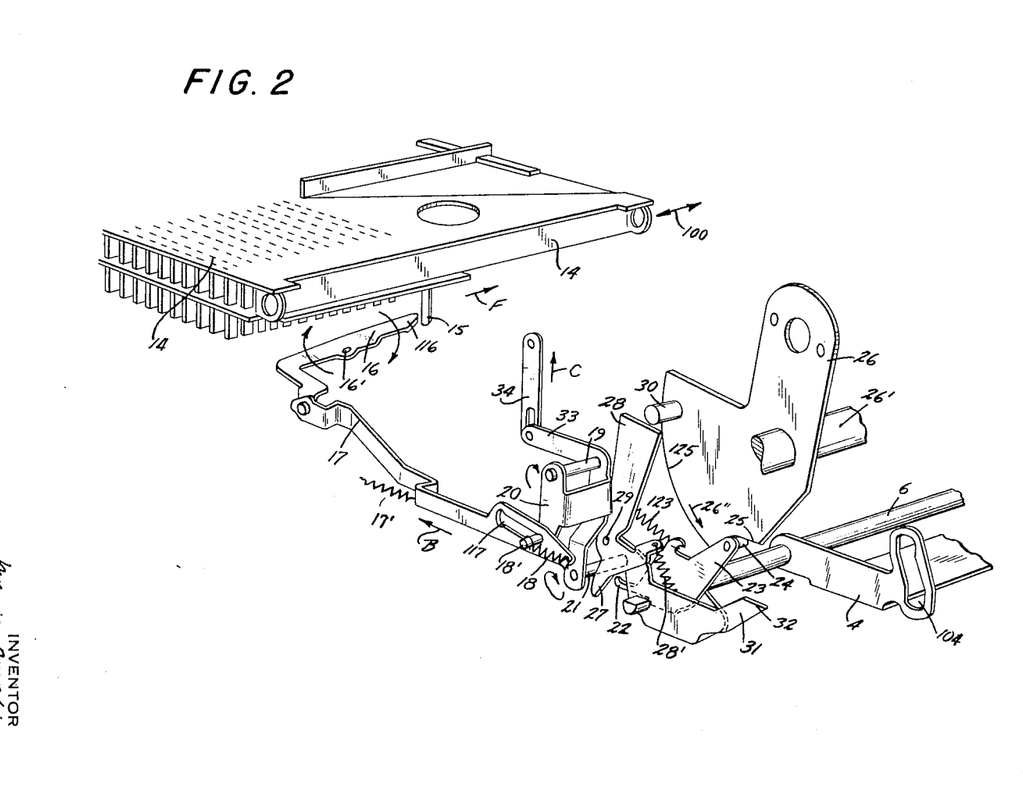
FIGURE 2 is a perspective view of the apparatus shown in FIGURE 1 illustrating another operational position in which the pin carriage has been shifted one step.

Referring now to FIGURES 1 and 2, control means are provided for shifting lever 4, and thereby supporting member 101 and pinion 1. A first control members is constituted by the main cam 26 which has a projecting pin 30, and a cam track 125 with a depressed portion 25. Cam 26 is operated by the main shaft of the machine 26' to perform a forward stroke and a return stroke during each operational cycle of the machine. A second control member 31 is fixed to shaft 6 to which lever 4 is also fixed, as described above, consequently turning of the second control member 31 will effect shifting of the pinion 1 between coupled and disengaged position. Control member 31 has a projection 32 cooperating with pin 30, as will be described hereinafter, and is articulated by a pin 29 to a third control member 28 which is under the action of a spring 28' and tends to turn into a position in which its free end is located in the path of pin 30 of the first control member 26. Control member 28 has a projecting part 27 cooperating with a pin 21 which is part of a fourth control member 20. Control member 20 has an arm provided with a pin 18' which passes through a slot in a bar 17, and is connected by a spring 18 to the free end of bar 17. Control member 20 is pivotally connected to a three-armed lever 35 which is turnably mounted on the machine frame by means of a pivot 135, as best seen in FIG. 7. Bar 17 is pivotally connected with a lever 16 which is turnable on a pin 16' mounted on the frame of the machine, and has an end portion 116 cooperating with a pin 15 which is fixed on the pin carriage 14. A spring 17' pulls bar 17 to the left in FIG. 1.

Pin carriage 14 mounted on guide means for movement in the direction indicated by arrow 100, moves in direction of arrow F during introduction of a number, and moves in direction of arrow R when returning to its initial position.

A shifting lever 23 is freely turnable on shaft 6 and has a cam follower means 24 cooperating with the cam track 25, 125 of control member 26. A hook-shaped portion 22 is provided on shifting lever 23 which cooperates with pin 21 of control member 20 but is spaced from the same as long as cam follower means 24 engages cam track portion 25. A spring 123 urges shifting lever 23 into engagement with cam track 125, 25. Control member 20 has an arm 33 which is articulated to a link 34, and as best seen in FIGURE 8, link 34 is pivotally connected to a lever 134 which is connected to the total-taking key 45 of the machine. When key 45 is actuated, member 20 turns clockwise so that pin 21 moves away from hook 22 while pin 18' moves to the left end of slot 117.

Figure 9:
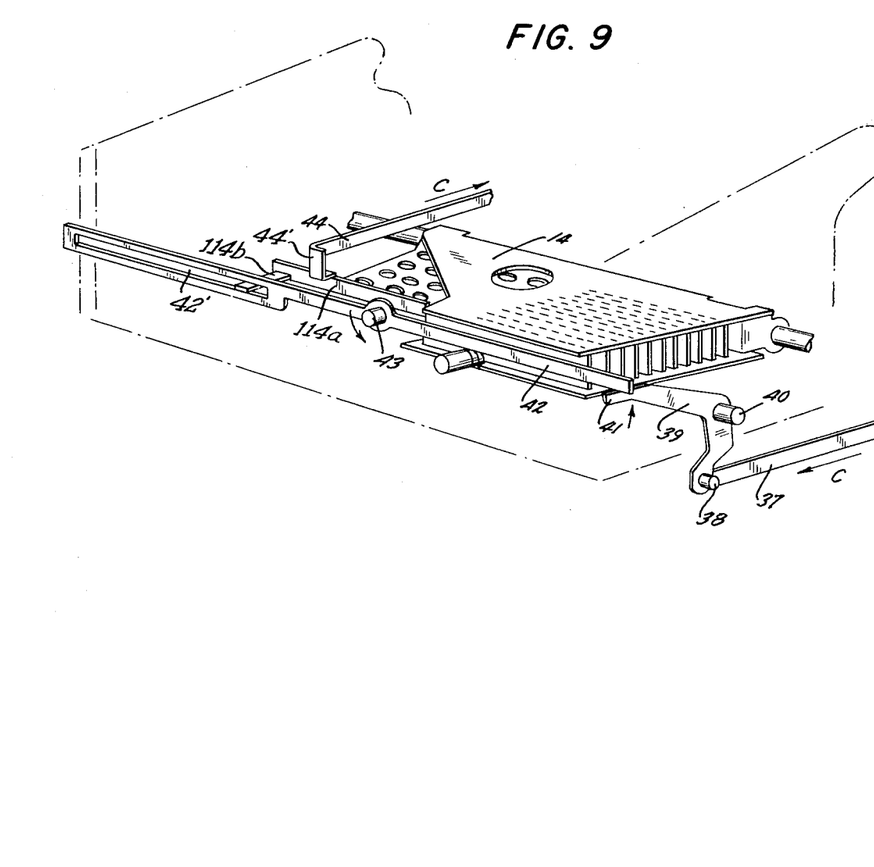

As best seen in FIGURE 7, a three-armed lever 35 is turnably mounted at 135 on the frame of the machine, and is connected to pin 19 of the control member 20. An arm 136 of lever 135 has a pin 36 pivotally connected to a link 37 whose other end is articulated by pin 38 to a lever 39 which is turnably mounted on a pin 40 on the machine frame. As best seen in FIGS. 7 and 9, the other end 41 of lever 39 engages the end of a coupling lever 42 having a slot 42' slidably receiving a projecting portion 114b of a coupling member 114a which is mounted on the pin carriage 14 for movement between a coupling position engaged by transverse lugs 44' of selector rods 44 for connecting all selector rods 44 to the pin carriage, and a releasing position in which the selector rods 44 are freely movable. Coupling lever 42 is turnable about a pivot means 43 on the frame of the machine so that projection 114b moves along slot 42' during movement of the pin carriage.

The device operates as follows:

At the beginning of an operational cycle, the device is in the position shown in FIGURE 1, while the gear teeth members 1 and 12 are engaged as shown, for example, in FIGURE 4.

Since the pin carriage is in its initial position, pin 15 engages lever 16. As soon as a digit is introduced into the pin carriage 14 by setting a pin under control of a key, not shown, the pin carriage moves one step in direction of the arrow F in FIGURE 2, and assumes the position shown in FIGURE 2. During introduction of a multi-order number, the pin carriage will move several steps corresponding to the order of the number, but for the operation of the device of the present invention a single step of the pin carriage corresponding to a digit introduced into the unit order is sufficient.

When lever 16 is released by pin 15, linkage means 17, 18 are moved by spring 17' in direction of the arrow B in FIGURE 2 so that control member 20 turns about the axis of pin 19 in clockwise direction. As best seen in FIGURE 8, the same clockwise turning of control member 20 can be obtained by depressing the total key 45, since lever 134 turns, and raises link 34 in direction of arrow C.

When control member 20 turns in clockwise direction, pin 21 moves to the left from the position shown in FIGURE 1 to the position shown in FIGURE 2, so that control member 28 is free to turn under the action of spring 28' in clockwise direction. In the position of FIGURE 1, pin 21 engages projection 27 of control member 28, and holds control member 28 in a position in which it is located outside of the path of movement of pin 30 of control member 26. When control member 28 turns to the position of FIGURE 2, it is located in the path of pin 30.

In this position, a digit has been introduced and a pin is set in the first order of the pin carriage, but the operational cycle has not yet started, and members 26, 12, 4, and 31 have not yet moved.

An operational cycle of the machine is now started, and the number set in the pin carriage is transferred through selector rods 44 to the differential gear sectors 12 which correspondingly set the printing means 112.

During the operational cycle, main shaft 26' operates control member 26 to turn in a forward stroke and in a return stroke through an angle of about 90°. Cam 26 is shown in its initial position in FIGURES 1 and 2, in an intermediate position in FIG. 3', and is shown at the end of the forward stroke before the beginning of the return stroke in FIGURE 5. During the forward stroke of control member 26, each sector 12 is also turned in counter-clockwise direction through an angle corresponding to the value of the digit set in the respective order of the pin carriage. The turning angle of gear sectors 12 is controlled by sector rods 44, which sense the positions of the associated pins in the selector carriage 14. This operation is known and not an object of the present invention.

When control member 26 performs its forward stroke, pin 30 engages control member 28 as shown in FIG. 3', and pushes it downward so that control member 31 is turned in counter-clockwise direction since it is connected by pin 29 to control member 28.

Control member 31 is fixed on shaft 6 which also carries arm 4 by which supporting member 101 of the respective repeat storing pinion is controlled. Consequently arm 4 moves from the position of FIGURE 4 to the position of FIGURE 3 and FIGURE 3' effecting disengagement between storing pinion 1 and gear sector 12. In the event that pinion 1 was turned during the preceeding operation, as will be described hereinafter, and is in the position shown in FIGURE 6 in which spring 8 is tensioned, pinion 1 will turn under the action of spring 8 until stop 10 engages stop 11 as shown in FIGURE 3. At the beginning of the forward stroke of control member 26, cam follower 24 will move from cam track portion 25 to cam track portion 125, and shifting lever 23 will make a rocking movement. However, since hook portion 22 is free and spaced from pin 21, such rocking movement will have no effect.

While control member 26 performs its forward stroke, differential gear sectors 12 are also turned to assume a position representing the respective digit.

At the end of the forward stroke of control member 26 in direction of arrow 26'', control member 26 assumes the position shown in FIGURE 5, which is also the position at the beginning of the return stroke. In this position, pin 30 engages the portion 32 of control member 31 so that control member 31 is turned in clock-wise direction from the position of FIGURE 3' to the position of FIGURE 5. This results in turning of shaft 6 and of arm 4, so that supporting member 101 is turned about pin 3, and moves pinion 1 from the disengaged position shown in FIGURE 3 to the coupling position shown in FIGURE 5 in which pinion 1 engages gear sector 12. Projection 10 still abuts against stop 11, and spring 8 is not tensioned.

In the position shown in FIGURE 5, the digit 5 is assumed to be introduced into the gear sector 12 so that gear sector 12 is correspondingly turned. In the position of FIGURE 4, no digit is introduced into the respective gear sector 12.

When control member 31 is turned in clockwise direction, control member 28 is again raised which is possible since pin 30 is no longer located opposite control member 28, but is located opposite portion 32 of control member 31, as shown in FIGURE 5.

During the return stroke of control member 26, and of the gear sectors 12, the gear sectors 12 remain in meshing engagement with the associated pinions 1. The gear sector 12 shown in FIGURE 5 whose angular displacement represented the digit 5 will turn in direction of arrow 12' from the position shown in FIGURE 5 to the position shown in FIGURE 6. Consequently, pinion 1 is turned in counter-clockwise direction, and spring 8 is wound on the annular shoulder of pinion 1 while projection 10 moves away from stop means 11. At the end of the return stroke, the position of FIGURE 6 is reached, and gear sector 12 is in its normal zero position, while pinion 1 has been turned through an angle representing the digit 5, and is spring-urged to turn in clockwise direction, which however is not yet possible since gear sectors 12 are controlled by rods 44 to remain in normal zero position until the next operational cycle is initiated.

It will be understood that the digit 5 which was previously introduced into the respective gear sector 12, and transferred by the gear sector 12 to the printing means 112, is now stored in the respective associated repeat storing pinion 1. Consequently every time a number is introduced into the pin carriage, and an operational cycle is performed, at the end of such operational cycle the introduced number will be stored in the repeat storing pinions.

At the end of the return stroke of operating member 26, that is at the end of the operational cycle, the pin carriage 14 is returned to its initial position in direction of arrow R in FIGURE 1. Upon return of the pin carriage to initial position, the pin carriage is cleared in a conventional manner.

During the last step of the pin carriage in return direction, pin 15 moves along the guide portion 116 of lever 16, and turns lever 16 in direction of arrow 216 in FIGURE 1. Turning of lever 16 in this direction effects shifting of bar 17 in direction of arrow B'. Control member 20 is turned in counter-clockwise direction since member 17 acts through spring 18 on pin 18' which is secured to control member 20. As control member 20 turns in counter-clockwise direction, its pin 21 engages portion 27 of control member 28, and turns control member 28 to a position in which it is located outside of the path of movement of pin 30. Control member 28 turns about pin 29, so that control member 31, and pinion 1 are not displaced, and pinion 1 remains in coupled position, as shown in FIGURE 6. Cam follower means 24 engages cam track portion 25 so that shifting lever 23 assumes its initial position.

In the event that no repeat operation is desired, a new number is now introduced into the pin carriage, and as soon as the first order of the number is introduced, the pin carriage will move one step from the position shown in FIGURE 1 to the position shown in FIGURE 2, and the above described operation will take place during the next following operational cycle, and control means 26, 30, 28, 31, 4, will operate the repeat storing means 101, 1, so that pinion 1 is disengaged from gear sector 12, and turns to its normal position under the action of spring 8 until projection 10 engages stop means 11. At the end of such next following circle, the new number introduced into the pin carriage will again be stored in the repeat storing pinions 1.

However, if no new number is introduced into the machine, so that the pin carriage is not shifted from the position shown in FIGURE 1 to the position in FIGURE 2, then lever 16 will remain blocked by pin 15 during a following operational cycle which is effected in the usual manner.

If the total key 45, shown in FIGURE 8, is depressed, and the operational cycle started, then control member 20 is also turned clockwise but since linkage means 16, 17 is not released by pin 15, bar 17 remains in the position of FIG. 1 while pin 18' moves to the left of slot 117 in bar 17 against the action of spring 18 as shown in FIG. 7. Pin 21 moves with the control member 20 out of the path of hook 22 of shifting lever 23 and consequently the above described operation will take place, and the repeat storing pinions will be disengaged, and cleared of the previously introduced number so as to store the total obtained during the respective operational cycle.

It is therefore apparent that at the end of an operational cycle, either the previously introduced number is stored in the repeat storing pinion, or a total is stored in the repeat storing pinion depending on whether the pin carriage was shifted following the operation of the number keys, or whether the total key was actuated.

As explained above, if a new number is introduced into the pin carriage, the thus stored number is cleared from the repeat storing pinions. However, if no new number is introduced by the number keys, and if the total key is not operated, control member 20 is not turned, and consequently repeat storing pinion 1 remains in meshing engagement and coupled to gear section 12 whereby each repeat storing pinion 1 controls the movement of the associated gear sector 12 from the position shown in FIGURE 6 into the position shown in FIGURE 5 so that gear sector 12 transfers the digit stored in the repeat storing pinion, the digit 5 according to the example previously described, to the printing means, and places printing means 112 in the corresponding printing position.

If no new number is introduced into the pin carriage, and if the total key is not actuated, this operation can be repeated as often as desired, since every time gear sector 12 performs its return stroke, the repeat storing pinions are loaded, and store the respective previously introduced digit. Since pinions 1 remain in meshing engagement with the gear sector during forward and return strokes, storing pinion 1 cannot return to its normal position without controlling the differential position of the respective gear sector 12.

In the illustrated embodiment, the selector rods 44 are connected by a pin 13 to their respective gear sectors 12 and selector rods 44 will move with gear sectors 12 when the same are controlled by the repeat storing pinions during the forward stroke of the operational cycle. Consequently, selector rods 44 will have to move to positions corresponding to the digits of the number which is transferred to gear sectors 12 under control of the repeat storing pinions 1. To permit such displacement of selector rods 44, and turning of sectors 12, selector rods 44 have to be released from the pin carriage 14. In the known ten-key calculator to which the present invention is applied, all selector rods 44 are normally locked in the zero position by coupling member 114a which engages the projections 44' of all selector rods 44. This serves the purpose of preventing those selector rods 44 in whose orders no digit was introduced from moving from the zero position to the "nine" position when the gear sectors are released during the forward stroke of the operating means of the machine. For example, if a number is introduced into the three lowest orders of the pin carriage, the stepwise movement of the pin carriage will effect passing of the selector rods of the three lowest orders beyond the end of coupling member 114a, while the selector rods of the higher orders will remain blocked in the zero positions so that no printing takes place in the higher orders. If the selector rods of the higher orders were free to move to the "nine" position, "9" would be printed in all higher orders.

During the operation of the machine in accordance with the present invention under control of the repeat storing pinions, the pin carriage remains in the initial position so that all selector rods are blocked by coupling member 114a. Therefore, it is necessary to move coupling member 114a to a releasing position releasing all selector rods 44 which is accomplished by turning coupling lever 42 about pivot means 43 under control of lever 39.

At the beginning of the forward stroke of control member 26, cam follower 24 of shifting lever 23 passes from cam track portion 25 to cam track portion 125. Consequently, shifting lever 23 is rocked, and hook 22 engages pin 21 so that control member 20 is raised and turns lever means 35 clockwise about axis 135. Bar 17 turns about the pivot on lever 16, while pin 18', remaining at the right end of slot 117 of bar 17, raises the end of bar 17. Linkage means 16, 17 is locked by member 15 during a repeat operation. As lever 35 turns with arm 136, pin 36 shifts link 37 so that lever 39 is turned about pin 40 in clockwise direction. Portion 41 of lever 39 engages coupling lever 42 and turns the same about pivot means 43 in counter-clockwise direction as viewed in FIG. 9 so that the other end of coupling lever 42 is lowered whereby coupling member 114a is also lowered and releases the projecting positions 44' of selector rods 44 so that the same are no longer blocked in the zero position, although the pin carriage is in the initial position, and can longitudinally move when the respective gear sectors 12 move under control of the repeat storing pinions 1. However, the selector rods will only move in those orders in which the repeat storing pinions represent a stored numerical value. In the higher orders, the repeat storing pinions are in "zero" position, and prevent movement of the respective selector rods.

At the end of the return stroke of a repeat operation, cam track portion 25 is located opposite cam follower 24 so that spring 123 pulls arresting lever 23 in counter-clockwise direction resulting in release of pin 21 by hook 22. Control member 20 moves down so that lever 35 turns counter-clockwise about pivot 135 whereby the shiftable means 37, 38, 39 return to the normal position in which coupling member 114a is raised by coupling lever 42 to block movement of selector rods 44. If the next operation is again a repeat operation, then cam track 125 effects shifting of control member 20 through arresting lever 23, and operation of the coupling means 42. If the next following operation is started by introduction of a number into the pin carriage, or by operation of the total key, then control member 20 is turned in clockwise direction, and pin 21 is moved away from hook 22 so that the rocking of arresting lever 23 by cam track 25, 125 has no effect. When the total key 45 is depressed, pin 18' is shifted to the left end of slot 117 against the action of spring 18.

It will be understood that each of the elements described above, or two or more together, may also find a useful application in other types of computing machines differing from the types described above.

While the invention has been illustrated and described as embodied in a repeat storing device for a computing machine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a computing machine, in combination, a pin carriage movable between an initial position and at least one denominationally shifted position; a differential gear sector movable differentially from a normal zero position in a forward stroke and reversely to normal position in a return stroke during each cycle of the computing machine, said differential gear sector being adapted to be connected to a printing means; selector means connected with said differential gear sector and differentially controlled by a selected pin of said pin carriage; repeat storing means including a movable supporting member, a repeat storing pinion rotatably mounted on said supporting member and being movable with the same between a position meshing with and coupled to said differential gear sector, and a disengaged position, said pinion having an annular shoulder, an elongated spring means connected to said pinion and to said supporting member and urging said pinion to turn to a normal zero position, said spring means being positioned on said annular shoulder to be wound up on the same when said pinion turns out of said normal position and to thus bias said pinion to turn back to said normal zero position, and stop means on said supporting member for stopping said pinion in said normal zero position; control means for shifting said supporting member between said engaged and disengaged positions and operable to invariably couple said pinion with said differential gear sector during the return stroke thereof and selectively adjustable to maintain said pinion engaged with said differential gear sector during the forward stroke of the same in the next following cycle or to disengage said pinion therefrom so that said pinion is moved differentially from normal zero position and registers a digit introduced into said differential sector during the return stroke of said differential sector, and, while returning to said normal zero position thereof during the following forward stroke, either remains engaged and controls the movement of said differential element during the following forward stroke of the following operational cycle to a position representing the digit, or is disengaged from said differential sector during said following forward stroke of the same so that said pinion is returned idly to a normal zero position by said spring means and said differential gear sector is free for introduction of another digit under control of said pin carriage during the next following cycle, and means controlled by said pin carriage for adjusting said control means to maintain said pinion engaged with said differential gear sector during the forward stroke of the sector when said pin carriage is in its initial position during the cycle of the machine.

2. In a computing machine, in combination, a pin carriage movable between an initial position and at least one denominationally shifted position; a differential gear sector movable differentially from a normal zero position in a forward stroke and reversely to normal position in a return stroke during each cycle of the computing machine, said differential gear sector being adapted to be connected to a printing means; selector rod means connected with said differential gear sector and differentially controlled by a selected pin of said pin carriage; repeat storing means including a movable supporting member, a repeat storing pinion rotatably mounted on said supporting member and being movable with the same between a position meshing with and coupled to said differential gear sector and a disengaged position, spring means connected to said pinion and to said supporting member and urging said pinon to turn to a normal zero position, and stop means on said supporting member for stopping said pinion in said normal position; and control means for shifting said supporting member and thereby said pinion between said engaged and disengaged positions, said control means including a first control member performing a forward stroke and a return stroke in each cycle of the machine, a second control member connected to said supporting member for movement thereof and being invariably engaged by said first control member at the end of the forward stroke of the same so as to shift said storing pinion to said coupled position, a third control member articulated to said second control member and being movable between an inoperative position and an operative position located in the path of movement of said first control member at the beginning of the forward stroke of the same, said third control member shifting said second control member when engaged in said operative position by said first control member for moving said storing pinion to said disengaged position during the forward stroke of said gear sector, a fourth control member movable from an inoperative position to an operative position for shifting said third control member to said inoperative position, and linkage means connecting said pin carriage with said fourth control member for shifting said fourth control member to said operative position when said pin carriage is in said initial position and to said inoperative position when said pin carriage moves from said initial position to said shifted position.

3. In a computing machine, in combination, a pin carriage movable between an initial position and at least one denominationally shifted position; a differential gear sector movable differentially from a normal zero position in a forward stroke and reversely to normal position in a return stroke during each cycle of the computing machine, said differential gear sector being adapted to be connected to a printing means; selector rod means connected with said differential gear sector and differentially controlled by a selected pin of said pin carriage; repeat storing means including a movable supporting member, a repeat storing pinion rotatably mounted on said supporting member and being movable with the same between a position meaning with and coupled to said differential gear sector and disengaged position, spring means connected to said pinion and to said supporting member and urging said pinion to turn to a normal zero position, and stop means on said supporting member for stopping said pinion in said normal position; control means for shifting said supporting member and thereby said pinion between said engaged and disengaged positions, said control means including a first control member performing a forward stroke and a return stroke in each cycle of the machine, a second control member connected to said supporting member for movement thereof and being invariably engaged by said first control member at the end of the forward stroke of the same so as to shift said storing pinion to said coupled position, a third control member articulated to said second control member and being movable between an inoperative position and an operative position located in the path of movement of said first control member at the beginning of the forward stroke of the same, said third control member shifting said second control member when engaged in said operative position by said first control member for moving said storing pinion to said disengaged position during the forward stroke of said gear sector, a fourth control member movable from an inoperative position to an operative position for shifting said third control member to said inoperative position, and linkage means connecting said pin carriage with said fourth control member for shifting said fourth control member to said operative portion when said pin carriage is in said initial position and to said inoperative position when said pin carriage moves from said initial positon to said shifted position; a total key; and means connecting said total key with said fourth control member for shifting the same to said inoperative position when said total key is actuated.

4. In a computing machine in combination, a pin carriage movable between an initial position and at least one denominationally shifted position; a differential gear sector movable differentially from a normal zero position in a forward stroke and reversely to normal position in a return stroke during each cycle of the computing machine, said differential gear sector being adapted to be connected to a printing means; selector rod means connected with said differential gear sector and differentially controlled by a selected pin of said pin carriage; a coupling member mounted on said pin carriage for movement between a coupling position connecting said selector rod means with said pin carriage and a releasing position releasing said selector rod means for free movement relative to said pin carriage; repeat storing means including a movable supporting member, a repeat storing pinion rotatably mounted on said supporting member and being movable with the same between a position meshing with and coupled to said differential gear sector and a disengaged position, spring means connected to said pinion and to said supporting member and urging said pinion to turn to a normal zero position, and stop means on said supporting member for stopping said pinion in said normal position; and control means for shifting said supporting member and thereby said pinion between said engaged and disengaged positions, said control means including a first control member including a cam performing a forward stroke and a return stroke in each cycle of the machine, a second control member connected to said supporting member for movement thereof and being invariably engaged by said first control member at the end of the forward stroke of the same so as to shift said storing pinion to said coupled position, a third control member articulated to said second control member and being movable from an inoperative position to an operative position located in the path of movement of said first control member at the beginning of the forward stroke of the same, said third control member shifting said second control member when engaged in said operative position by said first control member for moving said storing pinion to said disengaged position during the forward stroke of said gear sector, a fourth control member movable from an inoperative position to an operative position for shifting said third control member to said inoperative position, and linkage means connecting said pin carriage with said fourth control member for shifting said fourth control member to said operative position when said pin carriage is in said initial position and to said inoperative position when said pin carriage moves from said initial position to said shifted position; shiftable means connecting said fourth control member with said coupling member and being shiftable from a normal position to a shifted position for moving said coupling member from said coupled position to said releasing position; and a shifting member having cam follower means engaging said cam of said first control member and being shifted by the same during the forward stroke of said first control member so as to engage and shift said fourth control member and through the same said shiftable means to said shifted position in which said coupling member is in said releasing position.

5. An apparatus as set forth in claim 4 wherein said linkage means include a turnable lever, a bar articulated to said lever at one end and having a slot at the other end, and a spring secured to said other end; wherein said fourth control member has a pin passing through said slot and secured to said spring; and including a pin fixed to said pin carriage and engaging said turnable lever in said initial position of said pin carriage and releasing said turnable lever in said shifted position of said pin carriage.

6. An apparatus as set forth in claim 4 wherein said first control member includes a projecting pin engaging said third control member in said operative position of the same at the beginning of the forward stroke of said first control member and engaging said second control member at the end of the forward stroke of said first control member for shifting said supporting member with said pinion.

7. An apparatus as set forth in claim 4 and including a turnable shaft fixedly connected to said second control member, a slotted lever fixed on said shaft; and a pin on said supporting member projecting into the slot of the slotted lever whereby said second control member is connected to said supporting member.

8. An apparatus as set forth in claim 4 wherein said cam of said first control member has a cam track including a first depressed portion engaging said cam follower means of said shifting member at the beginning of the forward stroke and at the end of the return stroke of said first control member, and having a continuous dwell portion engaging said cam follower means during the remainder of said forward stroke for actuating said shifting member.

9. An apparatus as set forth in claim 4 wherein said fourth control member includes a pin, and wherein said third control member has a projecting portion engaged by said pin of said fourth control member in said operative position for holding said third control member in said inoperative position.

10. An apparatus as set forth in claim 4 and including spring means connected to said third control member for urging the same into said operative position.

11. An apparatus as set forth in claim 4 wherein said pinion has an annular shoulder; wherein said spring means is an elongated coil spring secured to said pinion in the region of said annular shoulder and being wound on said annular shoulder when said pinion is turned by said differential gear sector during the return stroke of the same while said pinion is in said coupled position so that said pinion tends to rotate said gear sector during the following operational cycle of the machine when in coupled position.

References Cited in the file of this patent

UNITED STATES PATENTS

| 1,929,652 | Robertson | Oct. 10, 1933 |
| 2,034,345 | Kottmann | Mar. 17, 1936 |

FOREIGN PATENTS

| 210,148 | Australia | May 2, 1957 |
| 497,833 | Great Britain | Dec. 28, 1938 |